Figure 1:
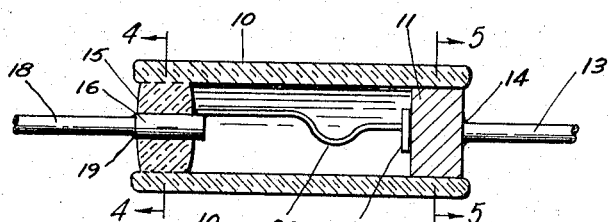

March 28, 1967  D. BAKALAR  3,311,800
MEANS AND METHOD OF SEALING GLASS ENCAPSULATED DIODES
Original Filed Nov. 2, 1959

INVENTOR.
DAVID BAKALAR
BY
EZEKIEL WOLF, WOLF & GREENFIELD
HIS ATTORNEYS

United States Patent Office 3,311,800
Patented Mar. 28, 1967

3,311,800
MEANS AND METHOD OF SEALING GLASS ENCAPSULATED DIODES
David Bakalar, Boston, Mass., assignor to Transitron Electronic Corporation, Wakefield, Mass., a corporation of Massachusetts
Continuation of application Ser. No. 850,432, Nov. 2, 1959. This application Aug. 6, 1965, Ser. No. 480,246
3 Claims. (Cl. 317—236)

This is a continuation of application Ser. No. 850,432 filed No. 2, 1959, now abandoned.

The present invention relates to a diode construction and more particularly to a glass encapsulated diode in which the glass will not crack or shatter on flexing the wire leads, and which further is better able to accommodate heat surges due to sudden increases in power.

Unless a glass diode is made with a reentrant seal at the junction of the glass and wire leads, there is a substantial likelihood of glass failure on flexing the lead during installation. A reentrant seal is one in which the glass surface has a doughnut-like surface about the wire lead, thereby providing a curved surface adapted to distribute the pressure of the bending lead evenly over the glass. Where the end of the capsule has, for example, a flat surface extending normally from the lead, flexing of the lead will cause point pressure on the glass. In such diode constructions the glass will fail after repeated flexure of the wire. However, as a practical matter, large scale manufacture of glass diodes with satisfactory reentrant seals is quite difficult. The rejection rate of glass diodes with reentrant seals is approximately as great as one in twenty. Moreover, frequently such glass diodes with defective seals will pass initial inspection.

In many applications the diode rate of failure must be very low. This is particularly true in computers or missiles where 8 or 10 thousand diodes are often used in each device. Consequently, the manufacture of glass diodes with satisfactory reentrant seals in quantity has been a problem.

In the present invention a soft glass capsule is sealed to a plug made of Dumet having a diameter slightly less than the inner diameter of the capsule. A wire lead is welded to the plug on one side. On the other side the semi-conductor material is mounted on the plug within the walls formed by the capsule. The other end of the capsule is closed by a glass bead having a rigid rod of Dumet projecting therethrough. One end of the rod has a wire connected to it external of the capsule. The other end of the rod has connected to it means forming a rectifying junction which in the described example comprises a cat whisker, which whisker is secured to the rod and also contacts the semi-conductor material.

In this construction there is, therefore, a unique Dumet plug to glass seal with the plug of a substantial diameter and with the entire sealing of the capsule effected at a relatively low temperature, thereby permitting the use of this construction in the manufacture of germanium diodes.

A modification of the invention utilizes a soft glass capsule sealed at both ends by plugs of Dumet having diameters slightly less than the inner diameter of the capsule. Leads are welded on the outer sides of the plugs with one plug supporting a semi-conductor material and the other having a cat whisker secured to it.

Another modification of the present invention provides a soft glass capsule sealed at both ends by glass beads. Projecting through the glass beads at each end are rigid rods of Dumet having diameters substantially less than the diameters of the beads. The inner surface of one rod supports the semi-conductor material while the inner surface of the other rod has secured to it a cat whisker. Wire leads are welded to the outer ends of the rods beyond the surface of the beads.

The utilization of Dumet as a plug material has been found to provide very substantial advantages over other types of materials such as molybdenum. Molybdenum can be sealed only to a hard glass at higher temperatures. This makes molybdenum and hard glass unsuited for germanium diodes because the electrical characteristics of the germanium wafer would be substantially affected by the temperature required to seal the hard glass to the molybdenum plug. Therefore, it is essential to use materials which will seal to soft glass. In addition molybdenum forms molybdenum oxide on the surface of which the semi-conductor material is to be mounted. Molybdenum oxide must be removed prior to mounting the semi-conductor material. Unlike oxide which forms on Dumet, molybdenum oxide is a very tenacious material and difficult to remove.

The present invention also provides a diode in which an enlarged conductive end plug is adapted to absorb more heat than seals of conventional structures. These plugs will, therefore, act as heat reservoirs to accommodate heat surges due to sudden increases in power.

While the present invention is described in connection with a point contact diode, the sealing means for these glass encapsulated diodes can be used also on other type diodes such as diffused, point contact and junction type diodes.

These and other objects and advantages of the present invention will be more clearly understood when considered in conjunction with the accompanying drawings, in which:

FIG. 1 is a longitudinal cross sectional view of the preferred form of the present invention.

Figure 2:
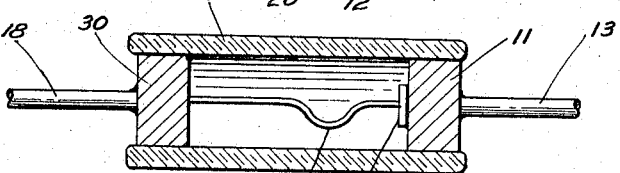
Figure 3:
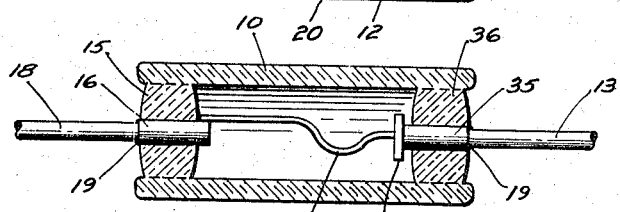
Figures 4, 5:
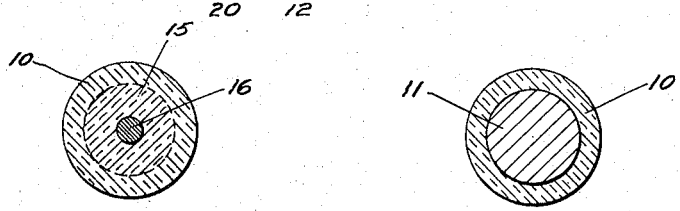

FIGS. 2 and 3 are longitudinal cross sectional views of modifications of the present inventions, and FIGS. 4 and 5 are respectively transverse sectional views of the preferred form of the present invention taken substantially along the lines 4—4 and 5—5 respectively of FIG. 3.

The construction illustrated in FIGS. 1, 4 and 5 overcomes many problems inherent in structures illustrated in prior art. In this arrangement a soft glass tube 10 of uniform diameter is bonded at one end to a Dumet plug 11 of slightly smaller diameter than the tube. The Dumet plug 11 has suitably mounted on it, by conventional means, a semi-conductor wafer 12. A lead wire 13 is secured on the opposite face of the plug 11 by welding 14 in a conventional manner. The other end of the tube 10 is fused to the glass bead 15. Sealed in a glass to metal seal and projecting through this bead is a rigid rod 16 of Dumet. The outer end of this rod projects preferably slightly beyond the outer end of the bead 15 and has a wire 18 welded to it by the weld 19. The inner end of this rod 16 projects inwardly beyond the inner wall of the bead 15 and has means for establishing a rectifying junction. In the preferred form this comprises a cat whisker 20 mounted on rod 16 with the other end of the cat whisker bonded in a rectifying junction or point contact to the semi-conductor wafer 12.

The plug 11 should have a diameter slightly less than the inner diameter of the tube 10 prior to sealing the glass to the plug. The space between the plug and inner surface of the tube should be just sufficient to permit insertion of the plug and its subsequent normal expansion during heating in the time interval prior to the softening of the glass. If the difference in diameters is too great, the end portions of the glass tube 10 will soften and sag away from the plug thereby creating a poor, lopsided and possibly defective seal.

As illustrative of the relative dimensions, in a preferred embodiment of the present invention the diameter of the cylindrical plug 11 may be .055" while the inner diameter of the glass tube may be .060". The outer diameter of the glass tube may be .100". The wire 13 which is welded to the plug may be a conventional .020 copper or Dumet wire. The bead 15 prior to fusing with the tube 10 should also have a diameter substantially the same as the diameter of the plug 11. In the case of the preferred embodiment described the bead may have a diameter of .055". The rod 16 which is made of Dumet, in the preferred described example, may have a diameter of .030". This rod must project inwardly beyond the inner surface of the bead 15 sufficiently to provide a projection to which the cat whisker 20 may be welded. The other end projects just beyond the outer surface of the bead 15, to provide a projection to which the flexible wire 18 may be secured in such a manner as to prevent it from being flexed into a pressure contact with the bead 15.

The material of which the plug 11 is made is of some importance. A preferred material is Dumet which is primarily a wire of nickel-iron alloy comprising approximately 52% nickel and 48% alloy, with a copper coating. The plug material must be highly conductive and preferably has a conductivity approaching that of copper. It must also have a coefficient of expansion closely matched with the soft glass hereinafter described. It must also be solid at temperatures at which the soft glass melts. Platinum, a nickel-iron alloy having approximately 52% nickel and other similar materials are also suitable for use as a plug.

The glass from which the bead 15 and tube 10 is made must be soft; that is, it must have a working temperature substantially no more than 980° C. By "working temperature" is meant the range of temperatures in which the the glass is assumed to correspond with a viscosity range from $10^4$ to $10^{7.6}$ poises. It also must have a coefficient of expansion substantially matched to the coefficient of expansion of the Dumet metal which forms the plug 11. Glass type 0120 and type 0010 made by the Corning Glass Company are suitable for this purpose. Hard glass which seals in a glass to metal seal at 1135° C. is unsuited. Such hard glass is used with molybdenum. The combination of soft glass having a working temperature approximately no more than 980° C. and plugs of Dumet metal permits the use of such construction in germanium diodes which are relatively sensitive to heat. Germanium, unlike silicon which is unaffected by temperatures as high as 300° C., is electrically affected at temperatures as low as 200° C.

The use of the rod 16 in combination with the plug 11 to close the ends of the diode has particular utility since this construction can be manufactured with a minimum amount of heat which would otherwise affect the electrical characteristics of the wafer. The rigid rod 16 functions to position the wire 18 well beyond the bead 15. It also has a diameter substantially smaller than that of the plug 11 and consequently does not act as the substantial heat reservoir that plug 11 does. In the assembly of the diode this avoids transmission of substantial heat during the sealing of the bead 15 to the wafer 12.

A modification of the present invention is illustrated in FIG. 2. In this arrangement as well as in the modification illustrated in FIG. 3 similar numbers denote elements corresponding to those illustrated in the preferred embodiment of FIG. 1.

The cat whisker 20 is welded to the Dumet plug 30 which is similar in composition and dimensions to a Dumet plug 11. The outer surface of the plug 30 has the lead wire 18 welded to it. This modification provides a symmetrically sealed diode having opposed similar plugs closing the ends of the diode.

In the modification of FIG. 3, the wafer 12 is supported on the rod 35 of Dumet metal. The rod 35 is similar in dimensions and composition to the rod 16.

The wire 13 is secured to the outer end of the rod 35 by welding 19 in a manner similar to securing of the wire 18 to the rod 16. The rod 35 is sealed in a bead 36 similar in dimension and composition to the bead 15.

What is claimed is:
1. A glass encapsulated semiconductor device comprising, a hollow cylindrical glass tube having a wall thickness less than the inside diameter of said tube, first and second metal end caps sealing off the ends of said glass tube each bounded by a circumferential surface fused to the inside wall of said tube, the outside diameter of each end cap corresponding substantially to said inside diameter, said end caps having a thermal coefficient of expansion substantially equal to that of said glass, first and second flexible conducting leads having one end attached to said first and second end caps respectively along the common axis of said tube and said end caps at a point substantially flush with the surface of a respective end cap outside the volume enclosed by said tube and said end caps, the cross sectional area of each of said leads being much less than that of each end cap, said first end cap comprising a metal cylindrical structure of high thermal and electrical conductivity having a conducting surface inside said volume and having a cross sectional area greater than that of said first lead attached to said structure at said point substantially flush with said end cap outside surface, a wafer of semiconductor material supported by and in electrical and thermal contact with said inside conducting surface, and means including a lead having a diameter less than that of said second flexible lead and a metal cylindrical structure with a cross sectional area greater than that of said second flexible lead for establishing rectifying contact between the latter lead and a point on the surface of said wafer, said cylindrical structures being the only metal in contact with glass encapsulating said wafer and comprising said points substantially flush with said outside surfaces.

2. A glass encapsulated semiconductor device comprising, a hollow cylindrical glass tube having a wall thickness less than the inside diameter of said tube, first and second metal end caps sealing off the ends of said glass tube each bounded by a circumferential surface fused to the inside wall of said tube, the outside diameter of each end cap corresponding substantially to said inside diameter, said end caps having a thermal coefficient of expansion substantially equal to that of said glass, first and second flexible conducting leads having one end attached to said first and second end caps respectively along the common axis of said tube and said end caps at a point substantially flush with the surface of a respective end cap outside the volume enclosed by said tube and said end caps, the cross sectional area of each of said leads being less than that of each end cap, said end caps each comprising a metal cylindrical structure of high thermal and electrical conductivity having a conducting surface inside said volume and having a cross sectional area greater than that of said leads attached to said structure at said point substantially flush with said end cap outside surface, a wafer of semiconductor material supported by and in electrical and thermal contact with said inside conducting surface, at least a part of said semiconductor material forming a rectifying area and means for establishing contact between the second flexible lead and a point on the surface of said wafer, said end caps comprising the only metal in contact with said inside wall having said points substantially flush with said ends of said tubes.

3. A glass encapsulated semiconductor device comprising,
   a hollow cylindrical glass tube having a wall thickness less than the inside diameter of said tube,
   first and second metal end caps sealing off the ends of said glass tube each bounded by a circumferential surface fused to the inside wall of said tube, the outside diameter of each end cap corresponding substantially to said inside diameter, said end caps having a thermal coefficient of expansion substantially equal to that of said glass, first and second flexible conducting leads having one end attached to said first and second end caps respectively along the common axis of said tube and said end caps outside the volume enclosed by said tube and said end caps, the cross-sectional area of each of said leads being less than that of each end cap, said end caps each comprising a metal cylindrical structure of high thermal and electrical conductivity having a conducting surface inside said volume and having a cross-sectional area greater than that of said first and second lead attached to said structure, a wafer of semiconductor material supported by and in electrical and thermal contact with said inside conducting surface, at least a part of said semiconductor material forming a rectifying area, means for establishing contact between the second flexible lead and a point on the surface of said wafer, and said end caps comprising the only metal in contact with said inside wall.

No references cited.

JAMES D. KALLAM, *Primary Examiner.*